US011524353B2

(12) United States Patent
Takada

(10) Patent No.: US 11,524,353 B2
(45) Date of Patent: *Dec. 13, 2022

(54) METHOD OF ARC WELDING

(71) Applicant: DAIHEN Corporation, Osaka (JP)

(72) Inventor: Kento Takada, Osaka (JP)

(73) Assignee: DAIHEN Corporation, Osaka (JP)

( * ) Notice: Subject to any disclaimer, the term of this patent is extended or adjusted under 35 U.S.C. 154(b) by 164 days.

This patent is subject to a terminal disclaimer.

(21) Appl. No.: 17/022,964

(22) Filed: Sep. 16, 2020

(65) Prior Publication Data

US 2021/0094114 A1    Apr. 1, 2021

(30) Foreign Application Priority Data

Sep. 27, 2019 (JP) .............................. JP2019-176927

(51) Int. Cl.
 B23K 9/09    (2006.01)
 B23K 9/12    (2006.01)
 B23K 9/133    (2006.01)

(52) U.S. Cl.
 CPC .............. B23K 9/09 (2013.01); B23K 9/125 (2013.01); B23K 9/133 (2013.01); B23K 9/1336 (2013.01)

(58) Field of Classification Search
 CPC .......... B23K 9/073; B23K 9/09; B23K 9/125; B23K 9/133; B23K 9/1336; B23K 9/12
 USPC ...................................................... 219/130
 See application file for complete search history.

(56) References Cited

U.S. PATENT DOCUMENTS 6,515,259 B1 * 2/2003 Hsu ....................... B23K 9/092
                                                        219/130.51
6,831,251 B1   12/2004 Artelsmair et al.
8,124,913 B2 * 2/2012 Artelsmair ............. B23K 9/092
                                                        219/130.21
(Continued)

FOREIGN PATENT DOCUMENTS

EP        3 357 624 A1    8/2018
JP        2005-313179 A    11/2005
(Continued)

OTHER PUBLICATIONS

Search Report issued in the corresponding European Patent application, dated Feb. 25, 2021 (7 pages).

*Primary Examiner* — Ibrahime A Abraham
*Assistant Examiner* — Frederick F Calvetti
(74) *Attorney, Agent, or Firm* — Hamre, Schumann, Mueller & Larson, P.C.

(57) ABSTRACT

Welding is performed by alternately switching a pulse arc welding period (where welding is performed by forward feeding a welding wire by a rotation for the forward feeding of a push side feeding motor and a rotation for the forward feeding of the pull side feeding motor and feeding a peak current and a base current) and a short-circuiting transition arc welding period (welding is performed by forward/backward feeding the welding wire by the rotation for the forward feeding of the push side feeding motor and a rotation for the forward/backward feeding of the pull side feeding motor and feeding a short-circuiting current and an arc current). During the short-circuiting transition arc welding period, a forward feeding peak value Wsp and/or a backward feeding peak value Wrp of a pull feeding speed Fw are compensation-controlled based on a wire storage amount of an intermediate wire storage.

4 Claims, 3 Drawing Sheets

(56) References Cited

U.S. PATENT DOCUMENTS

| | | | |
|---|---|---|---|
| 8,513,568 B2* | 8/2013 | Kawamoto | B23K 9/09 |
| | | | 219/130.21 |
| 8,720,802 B2* | 5/2014 | Kerst | F02M 61/18 |
| | | | 239/585.5 |
| 8,723,080 B2* | 5/2014 | Kawamoto | B23K 9/067 |
| | | | 219/130.1 |
| 9,550,248 B2* | 1/2017 | Hearn | B23K 9/125 |
| 2002/0153363 A1* | 10/2002 | Hiraoka | B23K 9/0213 |
| | | | 219/130.51 |
| 2004/0016788 A1* | 1/2004 | Huismann | B23K 9/1336 |
| | | | 226/188 |
| 2007/0056944 A1* | 3/2007 | Artelsmair | B23K 9/092 |
| | | | 219/130.5 |
| 2014/0263241 A1* | 9/2014 | Henry | B23K 9/1043 |
| | | | 219/130.21 |
| 2017/0252850 A1* | 9/2017 | Ide | B23K 9/125 |
| 2018/0099346 A1* | 4/2018 | Zwayer | B23K 9/173 |
| 2018/0354051 A1* | 12/2018 | Uecker | B23K 9/0953 |
| 2020/0198043 A1 | 6/2020 | Takada et al. | |
| 2021/0060792 A1* | 3/2021 | Yoshida | B23K 9/12 |

FOREIGN PATENT DOCUMENTS

| | | |
|---|---|---|
| JP | 2015-205347 A | 11/2015 |
| JP | 2017-094380 A | 6/2017 |
| JP | 2018-51579 A | 4/2018 |

* cited by examiner

METHOD OF ARC WELDING

FIELD

The present disclosure relates to an arc welding method to perform welding by alternately switching a pulse arc welding period and a short-circuiting transition arc welding period to each other.

BACKGROUND

The method is conducted where welding is performed by alternately switching a period to feed a welding wire and perform the pulse arc welding and a period to perform the short-circuiting transition arc welding to each other (see, for example, JP-A-2005-313179). In this case, the switching frequency is around 0.1 to 10 Hz. According to this welding method, scale-like beads with good appearance can be formed. Moreover, according to this welding method, control of heat input to a base material can be performed by adjusting the ratio between the period of the pulse arc welding and the period of the short-circuiting transition arc welding.

JP-A-2015-205347 discloses an arc welding method where the welding is performed by alternately switching a period to forward feed a welding wire and perform the pulse arc welding and a period to forward/backward feed a welding wire and perform the short-circuit transition arc welding. The forward/backward feeding arc welding method is conducted where while the short-circuit transition arc welding is performed, the feeding is the forward feeding during an arc period, and the feeding is the backward feeding during a short-circuiting period. Further, the switching from the pulse arc welding to the short-circuiting transition arc welding is performed during the base period after the droplet has transitioned due to the pulse arc welding.

In the forward/backward feeding arc welding method described above, the forward feeding and the backward feeding of the welding wire need to be switched to each other at high speed at around 10 Hz with high precision. Therefore, as the feeding mode, the push-pull feeding mode is adopted often. Further, an intermediate wire storage for temporarily storing the welding wire is often provided at a feeding passage between a push side feeding motor and a pull side feeding motor.

In the forward/backward feeding arc welding method, the forward feeding period and the backward forwarding period are switched to each other in synchronization with occurrences of the short-circuiting period and the arc period. Accordingly, if the welding conditions such as the set value of the welding voltage and the projection length vary, a time ratio between the short-circuiting period and the arc period varies and the time ratio between the forward feeding period and the backward feeding period also varies, and therefore the average feeding speed of the welding wire varies. If the average feeding speed varies, the amount of deposition varies, and thus the quality of welding deteriorates. To handle this issue, in the technology of JP-A-2017-094380, the welding wire is fed forward at a constant speed by the push side motor, a wire storage amount of the intermediate wire storage is detected, and based on this wire storage amount the pull feeding speed of the pull side motor is compensation-controlled. By this compensation control, variation of the average feeding speed is suppressed.

SUMMARY

In the arc welding method to alternately switch the period to forward feed the welding wire and perform the pulse arc welding and the period to forward/backward feed the welding wire perform the short-circuiting transition arc welding, the feeding speed and the feeding direction of the welding wire change frequently and abruptly. Therefore, it is required to stably feed the welding wire with high precision.

Regarding the above technical problem, the present disclosure is directed to provide the welding method for welding by alternately switching the pulse arc welding period and the short-circuiting transition arc welding period to stably feed the welding wire with high precision.

To solve the above problem, an arc welding method provided by one aspect of the present disclosure comprises:

feeding a welding wire by push-pull feeding control with a push side feeding motor that rotates for forward feeding and a pull side feeding motor that rotates for the forward feeding and backward feeding;

temporarily storing the welding wire in an intermediate wire storage arranged at a feeding passage between the push side feeding motor and the pull side feeding motor;

feeding the welding wire by compensating a push feeding speed of the push side feeding motor or a pull feeding speed of the pull side feeding motor based on a wire storage amount of the intermediate wire storage;

alternately switching, to each other, a pulse arc welding period and a short-circuiting transition arc welding period, the pulse arc welding period being configured such that pulse arc welding is performed by forward feeding the welding wire by a rotation for the forward feeding of the push side feeding motor and a rotation for the forward feeding of the pull side feeding motor and feeding a peak current and a base current, the short-circuiting transition arc welding period being configured such that short-circuiting transition arc welding is performed by forward/backward feeding the welding wire by the rotation for the forward feeding of the push side feeding motor and a rotation for the forward/backward feeding of the pull side feeding motor and feeding a short-circuiting current and an arc current, wherein during the short-circuiting transition arc welding period, a wave form parameter of the pull feeding speed is compensated based on the wire storage amount.

Preferably, the wave form parameter is at least one of a forward feeding peak value and a backward feeding peak value.

Preferably, the wave form parameter is a forward feeding peak value when the wire storage amount is larger than a target value and is a backward feeding peak value when the wire storage amount is smaller than the target value.

Preferably, the wave form parameter is a backward feeding peak value when the wire storage amount is larger than a target value and is a forward feeding peak value when the wire storage amount is smaller than the target value.

Preferably, during the pulse arc welding period, the push feeding speed and the pull feeding speed based on the wire storage amount are not compensated.

Preferably, during the pulse arc welding period, the push feeding speed is compensated based on the wire storage amount.

Preferably, during the pulse arc welding period, when the wire storage amount is out of a predetermined range, the push feeding speed is compensated based on the wire storage amount.

According to the configurations as above, in the arc welding method for welding by alternately switching a period to forward feed a welding wire and perform the pulse arc welding and a period to forward/backward feed a welding wire and perform the short-circuiting transition arc welding, the welding wire can be stably fed with high precision.

DRAWINGS

EMBODIMENTS

Preferred embodiments of the present disclosure are described below with reference to the accompanying drawings.

Figure 1:
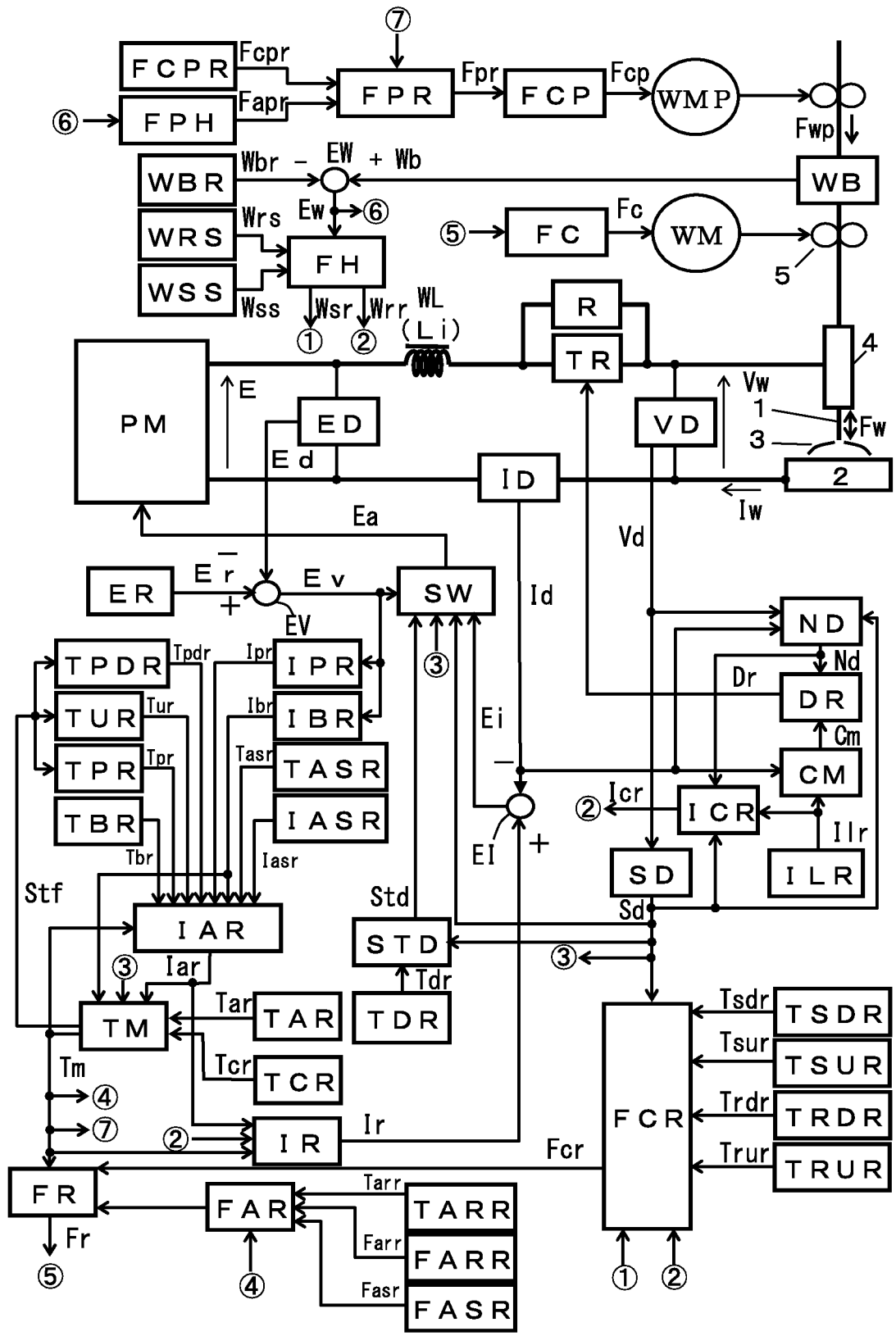
FIG. 1 is a block diagram of a welding power supply for conducting the arc welding method according to an embodiment of the present disclosure.

FIG. 1 is a block diagram of a welding power supply for conducting the arc welding method according to an embodiment of the present disclosure. Below, each block is explained with reference to FIG. 1.

A main power supply PM receives an input of a voltage from, for example, a three-phase 200V commercial power supply (not shown), performs output control by inverter control and so forth according to an error amplification signal Ea, and outputs an output signal E. The main power supply circuit PM includes, for example, a primary rectifier for rectifying an AC voltage from a commercial power supply into a DC voltage, and a smoothing condenser for smoothing the rectified DC voltage, an inverter circuit (driven by the above error amplification signal Ea) for converting the smoothed DC voltage to a high frequency AC voltage, a high frequency transformer for lowering the voltage value of the high frequency AC voltage so that it is appropriate for welding, and a secondary rectifier for rectifying the lowered high frequency AC voltage into a DC voltage.

A reactor WL smooths a welding current Iw and makes a stabilized arc 3 continue.

A push side feeding motor WMP receives an input of a push feeding control signal Fcp, rotates for the forward feeding and feed a welding wire 1 at a push feeding speed Fwp. A pull side feeding motor WM receives an input of a pull feeding control signal Fc, rotates for the forward/backward feeding and feed a welding wire 1 at a pull feeding speed Fw. The push side feeding motor WMP is arranged on the upstream side of a feeding passage, and the pull side feeding motor WM is arranged on the downstream side. Both the feeding motors are speed-controlled. Both the feeding motors constitute a push-pull feeding control system.

An intermediate wire storage WB is arranged on a feeding passage between the push side feeding motor WMP and the pull side feeding motor WM, temporarily stores (a part of) the welding wire 1, and outputs a wire storage amount signal Wb according to the wire storage amount. For the details of the intermediate wire storage WB, see JP-A-2017-094380. Detection of the storage amount of the welding wire 1 can be performed by a mechanical principle, an electric principle, an optical principle, a magnetic principle, or a combination of those principles.

The welding wire 1 is fed through a welding torch 4 by a rotation of a feeding roll 5 combined to the pull side feeding motor WM, an arc 3 occurs between the tip of the welding torch 4 and a base material 2. Between a power feeding chip (not shown) inside the welding torch 4 and the base material 2 a welding voltage Vw is applied, and a welding current Iw runs therebetween. From the tip of the welding torch 4 shield gas (not shown) is ejected and shields the arc 3 from the atmosphere. As the shield gas, in the case where the material of the welding wire 1 is steel, mixture of argon gas and carbon dioxide gas is used, and in the case where the material of the welding wire 1 is aluminum, argon gas is used.

An output voltage setting circuit ER outputs a predetermined output voltage setting signal Er. An output voltage detection circuit ED detects and smooths the output voltage E, and outputs an output voltage detection signal Ed.

A voltage error amplification circuit EV receives inputs of the output voltage setting signal Er and an output voltage detection signal Ed, amplify an error between the output voltage setting signal Er (+) and an output voltage detection signal Ed (−), and outputs a voltage error amplification signal Ev.

A current detection circuit ID detects the welding current Iw, and outputs a current detection signal Id. A voltage detection circuit VD detects the welding voltage Vw, and outputs a voltage detection signal Vd. A short-circuiting determination circuit SD receives an input of the voltage detection signal Vd, and outputs a short-circuiting determination signal Sd. When the voltage detection signal Vd is lower than a predetermined short-circuiting determination value (e.g., 10V), the short-circuiting determination signal Sd is determined to be in a short-circuiting period and is set to a "High" level, and when the voltage detection signal Vd is equal to or higher than the short-circuiting determination value, the short-circuiting determination signal Sd is determined to be in an arc period and the short-circuiting determination signal Sd is set to a "Low" level.

A forward feeding acceleration period setting circuit TSUR outputs a predetermined forward feeding acceleration period setting signal Tsur.

A forward feeding deceleration period setting circuit TSDR outputs a predetermined forward feeding deceleration period setting signal Tsdr.

A backward feeding acceleration period setting circuit TRUR outputs a predetermined backward feeding acceleration period setting signal Trur.

A backward feeding deceleration period setting circuit TRDR outputs a predetermined backward feeding deceleration period setting signal Trdr.

A forward feeding peak initial value setting circuit WSS outputs a predetermined forward feeding peak initial value setting signal Wss.

A backward feeding peak initial value setting circuit WRS outputs a predetermined backward feeding peak initial value setting signal Wrs.

A storage amount setting circuit WBR outputs a predetermined storage amount setting signal Wbr for setting a target value of the wire storage amount. A storage amount error amplification circuit EW receives inputs of the above storage amount setting signal Wbr and the above storage amount signal Wb, amplifies the error between the storage amount setting signal Wbr(−) and the storage amount signal Wb(+), and outputs a storage amount error amplification signal Ew. The equation Ew=G*(Wb−Wbr) holds good, where G is the amplification ratio (positive value). Therefore, when the storage amount signal Wb is larger than the storage amount setting signal Wbr, the storage amount error amplification signal Ew takes a positive value, and when the storage amount signal Wb is smaller than the target value of the storage amount setting signal Wbr, the storage amount error amplification signal Ew takes a negative value.

A pull feeding speed compensation circuit FH receives inputs of the above forward feeding peak initial value setting signal Wss, the above backward feeding peak initial value setting signal Wrs, and the above storage amount error amplification signal Ew, selects one of the processings 1)-5) to perform the compensation-control, and outputs a forward feeding peak value setting signal Wsr and a backward feeding peak value setting signal Wrr. The compensation-controls (the modulation-controls) shown below are performed at a predetermined control cycle. The controlling cycle is very small, and is, for example, 0.1 ms. The compensation-controls shown below are the ones in the case where the control system adopts the P control, but the control system may adopt the PI control or the PID control as well.

Processing 1) the Case where Only the Forward Feeding Peak Value is Compensation-Controlled The forward feeding peak initial value setting signal Wss is compensation-controlled (modulation-controlled) by the storage amount error amplification signal Ew to output the forward feeding peak value setting signal Wsr=Wss+Ew. Further, the backward feeding peak initial value setting signal Wrs is output as it is, as the backward feeding peak value setting signal Wrr=Wrs.

Processing 2) the Case where Only the Backward Feeding Peak Value is Compensation-Controlled The backward feeding peak initial value setting signal Wrs is compensation-controlled (modulation-controlled) by the storage amount error amplification signal Ew to output the backward feeding peak value setting signal Wrr=Wrs+Ew. Further, the forward feeding peak initial value setting signal Wss is output as it is, as the backward feeding peak value setting signal Wsr=Wss.

Processing 3) the Case where the Forward Feeding Peak Value and the Backward Feeding Peak Value are Compensation-Controlled The forward feeding peak initial value setting signal Wss is compensation-controlled (modulation-controlled) by the storage amount error amplification signal Ew to output the forward feeding peak value setting signal Wsr=Wss+Ew. Further, the backward feeding peak initial value setting signal Wrs is compensation-controlled (modulation-controlled) by the storage amount error amplification signal Ew to output the backward feeding peak value setting signal Wrr=Wrs+Ew.

Processing 4) the First Case of when the Forward Feeding Peak Value and the Backward Feeding Peak Value are Compensation-Controlled Depending on a Sign of the Storage Amount Error Amplification Signal Ew When the storage amount error amplification signal Ew is equal to or larger than 0, the forward feeding peak initial value setting signal Wss is compensation-controlled (modulation-controlled) by the storage amount error amplification signal Ew to output the forward feeding peak value setting signal Wsr=Wss+Ew. On the other hand, when the storage amount error amplification signal Ew is smaller than 0, the backward feeding peak initial value setting signal Wrs is compensation-controlled (modulation-controlled) by the storage amount error amplification signal Ew to output the backward feeding peak value setting signal Wrr=Wrs+Ew.

Processing 5) the Second Case of when the Forward Feeding Peak Value and the Backward Feeding Peak Value are Compensation-Controlled Depending on a Sign of the Storage Amount Error Amplification Signal Ew When the storage amount error amplification signal Ew is smaller than 0, the forward feeding peak initial value setting signal Wss is compensation-controlled (modulation-controlled) by the storage amount error amplification signal Ew to output the forward feeding peak value setting signal Wsr=Wss+Ew. On the other hand, when the storage amount error amplification signal Ew is equal to or larger than 0, the backward feeding peak initial value setting signal Wrs is compensation-controlled (modulation-controlled) by the storage amount error amplification signal Ew to output the backward feeding peak value setting signal Wrr=Wrs+Ew.

A short-circuiting arc pull feeding speed setting circuit FCR receives inputs of the above forward feeding acceleration period setting signal Tsur, the above forward feeding deceleration period setting signal Tsdr, the above backward feeding acceleration period setting signal Trur, the above backward feeding deceleration period setting signal Trdr, the above forward feeding peak value setting signal Wsr, the above backward feeding peak value setting signal Wrr, and the above short-circuiting determination signal Sd, and outputs, as a short-circuiting arc pull feeding speed setting signal Fcr, a feeding speed pattern generated by the processing as below. When the short-circuiting arc pull feeding speed setting signal Fcr takes a positive value, the process is in the forward feeding period, and when it takes a negative value, the process is in the backward feeding period.

1) During a forward feeding acceleration period Tsu determined by the forward feeding acceleration period setting signal Tsur, the short-circuiting arc pull feeding speed setting signal Fcr is output, which extends (accelerates) linearly from 0 (a value determined by a pulse pull feeding speed setting signal Far immediately after the switching to the short-circuit transition arc welding period Tc) to a forward feeding peak value Wsp which takes a positive value and is determined by the forward feeding peak value setting signal Wsr.

2) Subsequently, during a forward feeding peak period Tsp, the short-circuiting arc pull feeding speed setting signal Fcr which keeps the above forward feeding peak value Wsp is output.

3) When the short-circuiting determination signal Sd varies from the Low level (the arc period) to the High level (the short-circuiting period), the process changes to the forward feeding deceleration period Tsd determined by the forward feeding deceleration period setting signal Tsdr, and the short-circuiting arc pull feeding speed setting signal Fcr is output, which extends (decelerates) linearly from the above forward feeding peak value Wsp to 0.

4) Subsequently, during the backward feeding acceleration period Tru determined by the backward feeding acceleration period setting signal Trur, the short-circuiting arc pull feeding speed setting signal Fcr is output, which extends (accelerates) linearly from 0 to a backward feeding peak value Wrp of a negative value determined by the backward feeding peak value setting signal Wrr.

5) Subsequently, during the backward feeding peak period Trp, the short-circuiting arc pull feeding speed setting signal Fcr is output, which keeps the above backward feeding peak value Wrp.

6) When the short-circuiting determination signal Sd varies from the High level (the short-circuiting period) to the Low level (the arc period), the process changes to the backward feeding deceleration period Trd determined by the backward feeding deceleration period setting signal Trdr, and the short-circuiting arc pull feeding speed setting signal Fcr is output, which extends (decelerates) linearly from the above backward feeding peak value Wrp to 0.

7) By repeating above 1)-6), the short-circuiting arc pull feeding speed setting signal Fcr is generated, which varies as a positive-negative trapezoidal wave of the feeding pattern.

A current decreasing resistor R is inserted between the above reactor WL and the welding torch 4. The value of this current decreasing resistor R is set to a value (around 0.5-3 ohm) 50 times or more as large as the resistance value of the conducting passage of the welding current Iw (around 0.01-0.03 ohm) during the short-circuiting period. When the current decreasing resistor R is inserted in the conducting passage of the welding current Iw, the energy accumulated in the reactor WL and the reactor of the welding cable is rapidly consumed.

The transistor TR is parallelly connected to the above decreasing current resistor R, and is ON/OFF controlled according to the driving signal Dr.

A constriction detection circuit ND receives inputs of the above short-circuiting determination signal Sd, the above voltage detection signal Vd, and the above current detection signal Id, and outputs a constriction detection signal Nd. The constriction detection signal Nd changes to the High level at the time when the voltage increase of the voltage detection signal Vd reaches a reference value while the short-circuiting determination signal Sd is at the High level (short-circuiting period) with a determination that the formation status of the constriction has reached the reference status, and changes to the Low level at the time point when the short-circuiting determination signal Sd changes to the Low level (the arc period). Instead, it may be configured that the constriction detection signal Nd changes to the High level at the time point when the differential value of the voltage detection signal Vd during the short-circuiting period reaches a reference value corresponding thereto. Further, it may be configured that the resistance value of the droplet is calculated by dividing the value of the voltage detection signal Vd by the value of the current detection signal Id, and the constriction detection signal Nd is changed to the High level at the time point when the differential value of this resistance value reaches the reference value corresponding thereto.

A low level current setting circuit ILR outputs a predetermined low level current setting signal Ilr. A current comparison circuit CM receives inputs of this low level current setting signal Ilr and the above current detection signal Id, and outputs a current comparison signal Cm which becomes the High level when Id is smaller than Ilr, and become the Low level when Id is equal to or larger than Ilr.

A driving circuit DR receives inputs of the above current comparison signal Cm and the above constriction detection signal Nd, and outputs a driving signal Dr to the base terminal of the above transistor TR. The driving signal Dr changes to the Low level when the constriction detection signal Nd changes to the High level, and thereafter changes to the High level when the current comparison signal Cm changes to the High level. Therefore, when the constriction is detected, the driving signal Dr changes to the low level, the transistor TR turns to an off state and the decreasing current resistor R is inserted into the conducting passage, and the welding current Iw decreases rapidly. Then, when the value of the welding current Iw decreases to the value of the low level current setting signal Ilr, the driving signal Dr changes to the High level, and the transistor TR turns to an on state. Therefore, the decreasing current resistor R is short-circuited and returns to the normal status.

A short-circuiting current setting circuit ICR receives inputs of the above short-circuiting determination signal Sd, the above low level current setting signal Ilr, and the above constriction detection signal Nd, and executes the following processings to output the short-circuiting arc current setting signal Icr.

1) When the short-circuiting determination signal Sd is at the High level (the arc period), the short-circuiting arc current setting signal Icr is output which becomes the low level current setting signal Ilr.

2) When the short-circuiting determination signal Sd changes to the High level (the short-circuiting period), the short-circuiting arc current setting signal Icr is output which takes a predetermined initial current setting value in a predetermined initial period, rises to a predetermined peak setting value of the short-circuiting time at a predetermined inclination of the short-circuiting time, and maintains the value.

3) Thereafter, the short-circuiting arc current setting signal Icr is output which takes the value of the low level current setting signal Ilr, when the constriction detection signal Nd changes to the High level.

A current dropping time setting circuit TDR outputs a predetermined current dropping time setting signal Tdr.

A small current period circuit STD receives inputs of the above short-circuiting determination signal Sd and the above current dropping time setting signal Tdr, and outputs a small current period signal Std. The small current period signal Std changes to the High level when a time period determined by the current dropping time setting signal Tdr has elapsed since the change of the short-circuiting determination signal Sd to the Low level (the arc period), and thereafter changes to the Low level when the short-circuiting determination signal Sd changes to the High level (the short-circuiting period).

A peak period setting circuit TPR receives an input of a final pulse cycle signal Stf, and outputs a peak period setting signal Tpr. The peak period setting signal Tpr is a signal which is in a predetermined steady peak period when the final pulse cycle signal Stf is at the Low level, and is in a predetermined final peak period when the final pulse cycle signal Stf is at the High level.

A peak rising period setting circuit TUR receives an input of the final pulse cycle signal Stf, and outputs a peak rising period setting signal Tur. The peak rising period setting signal Tur is a signal which becomes a predetermined steady peak rising period when the final pulse cycle signal Stf is at the Low level, and becomes a predetermined final peak rising period when the final pulse cycle signal Stf is at the High level.

A peak falling period setting circuit TPDR receives an input of the final pulse cycle signal Stf, and outputs a peak falling period setting signal Tpdr. The peak falling period setting signal Tpdr is a signal which becomes a predetermined steady peak falling period when the final pulse cycle signal Stf is at the Low level, and becomes a predetermined final peak falling period when the final pulse cycle signal Stf is at the High level.

A base period setting circuit TBR outputs a predetermined base period setting signal Tbr.

A peak current setting circuit IPR receives an input of the above voltage error amplification signal Ev, performs the modulation-control, and outputs a peak current setting signal Ipr. The modulation-control is performed by integrating the voltage error amplification signal Ev, as $Ipr = Ip0 - \int Kp \cdot Ev \cdot dt$. Ip0 is an initial value of a peak current value, and Kp is a constant for adjusting a gain of peak current modulation-control to an appropriate value.

A base current setting circuit IBR receives an input of the above voltage error amplification signal Ev, performs the modulation-control, and outputs a base current setting signal Ibr. The modulation-control is performed by integrating the voltage error amplification signal Ev, as Ibr=Ib0−∫Kb*Ev*dt. Ib0 is an initial value of a base current value, and Kb is a constant for adjusting a gain of base current modulation-control to an appropriate value.

A pulse initial backward feeding period setting circuit TARR outputs a predetermined pulse initial backward feeding period setting signal Tarr.

A pulse initial current period setting circuit TASR outputs a predetermined pulse initial current period setting signal Tasr. A pulse initial current setting circuit IASR outputs a predetermined pulse initial current setting signal Iasr.

A pulse current setting circuit IAR receives inputs of a timer signal Tm, the above peak period setting signal Tpr, the above peak rising period setting signal Tur, the above peak falling period setting signal Tpdr, the above base period setting signal Tbr, the above peak current setting signal Ipr, the above base current setting signal Ibr, the above pulse initial current period setting signal Tasr, and the above pulse initial current setting signal Iasr, performs the following processing, and outputs the pulse current setting signal Iar.
1) The value of the pulse initial current setting signal Iasr is output as the pulse current setting signal Iar, while the timer signal Tm is at the Low level (the short-circuiting transition arc welding period).
2) The value of the pulse initial current setting signal Iasr is output as the pulse current setting signal Iar, while the pulse initial current period Tas continues which is determined by the pulse initial current period setting signal Tasr, starting from the time point when the timer signal Tm changes from the Low level to the High level (the pulse arc welding period).
3) Subsequently, during the peak rising period Tu determined by the peak rising period setting signal Tur, the pulse current setting signal Iar is output which rises from the value of the pulse initial current setting signal Iasr (the base current setting signal Ibr from the second pulse cycle) to the value of the peak current setting signal Ipr.
4) Subsequently, during the peak period Tp determined by the peak period setting signal Tpr, the pulse current setting signal Iar to maintain the value of the peak current setting signal Ipr is output.
5) Subsequently, during the peak falling period Tpd determined by the peak falling period setting signal Tpdr, the pulse current setting signal Iar is output which falls from the value of the peak current setting signal Ipr to the value of the base current setting signal Ibr.
6) Subsequently, during the base period Tb determined by the base period setting signal Tbr, the pulse current setting signal Iar to maintain the value of the base current setting signal Ibr is output.
7) The above 3)-6) are set as one pulse cycle, and are repeated until the timer signal Tm changes to the Low level.

A pulse arc welding period setting circuit TAR outputs a predetermined pulse arc welding period setting signal Tar. A short-circuiting transition arc welding period setting circuit TCR outputs a predetermined short-circuiting transition arc welding period setting signal Tcr.

A timer circuit TM receives inputs of the above pulse arc welding period setting signal Tar, the above short-circuiting transition arc welding period setting signal Tcr, the above short-circuiting determination signal Sd, the above pulse current setting signal Iar, and the above base current setting signal Ibr, and outputs the timer signal Tm and the final pulse cycle signal Stf. At the time point when a period determined by the short-circuiting transition arc welding period setting signal Tcr has elapsed since a time point (FIG. 2, t1) when the timer signal Tm has changed from the High level to the Low level (short-circuiting transition arc welding period Tc), and at the time point (FIG. 3, t1) when the short-circuiting determination signal Sd changes to the Low level (the arc period) for the first time, the timer signal Tm changes to the High level. When a pulse cycle is newly started after a period determined by the pulse arc welding period setting signal Tar has elapsed since the time point when the timer signal Tm has changed to the High level (the pulse arc welding period Ta), the process enters in a final pulse cycle Tsf. During the final pulse cycle Tsf, the final pulse cycle Tsf is ended at the time point when the pulse current setting signal Iar becomes equal to the value of the base current setting signal Ibr, and the timer signal Tm changes to the Low level. The final pulse cycle signal Stf changes to the High level only during the above final pulse cycle Tsf, and in the remaining period it stays at the Low level. Therefore, the pulse arc welding period Ta is the period of the pulse arc welding period setting signal Tar+the period before the start of the final pulse cycle Tsf+the period of the final pulse cycle Tsf. The short-circuiting transition arc welding period Tc is the period of the short-circuiting transition arc welding period setting signal Tcr+the period before the end of the first short-circuiting period thereafter.

A pulse initial backward feeding speed setting circuit FARR outputs a predetermined pulse initial backward feeding speed setting signal Farr which takes a negative value. A pulse forward feeding speed setting circuit FASR outputs a predetermined pulse forward feeding speed setting signal Fasr which takes a positive value. Depending on the value of the pulse forward feeding speed setting signal Fasr, the average feeding speed during the pulse arc welding period Ta is set.

A pulse pull feeding speed setting circuit FAR receives inputs of the above timer signal Tm, the above pulse initial backward feeding period setting signal Tarr, the above pulse initial backward feeding speed setting signal Farr, and the above pulse forward feeding speed setting signal Fasr, performs the following processing, and outputs the pulse pull feeding speed setting signal Far.
1) When the timer signal Tm is at the Low level (the short-circuiting transition arc welding period), the value of the pulse initial backward feeding speed setting signal Farr is output as the pulse pull feeding speed setting signal Far.
2) After the elapse of the pulse initial backward feeding period Tair determined by the pulse initial backward feeding period setting signal Tarr, since the time point when the timer signal Tm has changed from the Low level to the High level (the pulse arc welding period), the value of the pulse initial backward feeding speed setting signal Farr is output as the pulse pull feeding speed setting signal Far.
3) Subsequently, during the period until the timer signal Tm changes to the Low level, the value of the pulse forward feeding speed setting signal Fasr is output as the pulse pull feeding speed setting signal Far.

A pull feeding speed setting circuit FR receives inputs of the above timer signal Tm, the above short-circuiting arc pull feeding speed setting signal Fcr, and the above pulse pull feeding speed setting signal Far, and outputs the pulse pull feeding speed setting signal Far as a pull feeding speed setting signal Fr when the timer signal Tm is at the High level (the pulse arc welding period Ta) and outputs the short-circuiting arc pull feeding speed setting signal Fcr as the pull feeding speed setting signal Fr when the timer signal Tm is at the Low level (the short-circuiting transition arc welding period Tc).

A pull feeding control circuit FC receives an input of the above pull feeding speed setting signal Fr, and outputs the pull feeding control signal Fc for feeding the welding wire 1 at the pull feeding speed Fw corresponding to the value of the pull feeding speed setting signal Fr to the above pull side feeding motor WM.

A short-circuiting arc push feeding speed setting circuit FCPR outputs a predetermined short-circuiting arc push feeding speed setting signal Fcpr which takes a positive value. By the value of this short-circuiting arc push feeding speed setting signal Fcpr the average feeding speed during the short-circuiting transition arc welding period Tc is set.

A push feeding speed compensation circuit FPH receives an input of the above storage amount error amplification signal Ew, selects one of the processings 1)-3) shown below to perform the compensation-control, and outputs a pulse push feeding speed setting signal Fapr.
Processing 1) Compensation-control (modulation-control) a predetermined pulse push feeding speed initial value by the storage amount error amplification signal Ew and output the pulse push feeding speed setting signal Fapr=the pulse push feeding speed initial value−Ew.
Processing 2) When the storage amount error amplification signal Ew is out of the predetermined range, compensation-control (modulation-control) a predetermined pulse push feeding speed initial value by the storage amount error amplification signal Ew and output the pulse push feeding speed setting signal Fapr=the pulse push feeding speed initial value−Ew.
Processing 3) Output the predetermined pulse push feeding speed initial value as it is without applying the compensation-control as the pulse push feeding speed setting signal Fapr.

A push feeding speed setting circuit FPR receives inputs of the above timer signal Tm, the above short-circuiting arc push feeding speed setting signal Fcpr, and the above pulse push feeding speed setting signal Fapr, and outputs the above pulse push feeding speed setting signal Fapr as the push feeding speed setting signal Fpr when the timer signal Tm is at the High level (the pulse arc welding period Ta), and outputs the short-circuiting arc push feeding speed setting signal Fcpr as the push feeding speed setting signal Fpr when the timer signal Tm is at the Low level (the short-circuiting transition arc welding period Tc).

A push feeding control circuit FCP receives an input of the above push feeding speed setting signal Fpr, and outputs the push feeding speed setting signal Fpr for feeding the welding wire 1 at the push feeding speed Fwp corresponding to the value of the push feeding speed setting signal Fpr to the above push side feeding motor WMP.

A current setting circuit IR receives inputs of the above timer signal Tm, the above short-circuiting arc current setting signal Icr, and the above pulse current setting signal Iar, outputs the pulse current setting signal Iar as the current setting signal Ir when the timer signal Tm is at the High level (the pulse arc welding period Ta), and outputs the short-circuiting current setting signal Icr as the current setting signal Ir when the timer signal Tm is at the Low level (the short-circuiting transition arc welding period Tc).

A current error amplification circuit EI receives inputs of the above current setting signal Ir and the above current detection signal Id, amplifies an error between the current setting signal Ir (+) and the current detection signal Id (−), and outputs a current error amplification signal Ei.

A power supply characteristic switching circuit SW receives inputs of the above timer signal Tm, the above current error amplification signal Ei, the above voltage error amplification signal Ev, the above short-circuiting determination signal Sd, and the above small current period signal Std, performs the following processing, and outputs the above error amplification signal Ea.
1) Output the current error amplification signal Ei as the error amplification signal Ea during the period from the time point when the timer signal Tm is at the Low level and the short-circuiting determination signal Sd has changed to the High level (the short-circuiting period) to the time point when the short-circuiting determination signal Sd changes to the Low level (the arc period) and a delay period has elapsed.
2) Output the voltage error amplification signal Ev as the error amplification signal Ea during a large current arc period thereafter.
3) Output the current error amplification signal Ei as the error amplification signal Ea during an arc period thereafter, where the small current period signal Std changes to the High level.
4) Output the current error amplification signal Ei as the error amplification signal Ea when the timer signal Tm is at the High level, during a period from the time point when the timer signal Tm changes to the Low level and to the time point when the short-circuiting determination signal Sd changes to the High level for the first time. Due to this circuit, the welding power supply during the short-circuiting transition arc welding period Tc has a constant current characteristic during a period from the start of the short-circuiting transition arc welding period Tc to the first generation of short-circuiting thereafter, the short-circuiting period, the delay period and the small current arc period, and during the large current arc period other than those (the period from the time point when the above delay period has elapsed after the short-circuiting determination signal Std has changed from High to Low, to the time point when the small current period signal Std changes from Low to High, while the timer signal is Low) the welding power supply has a constant voltage characteristic. Further, the welding power supply during the pulse arc welding period Ta has a constant current characteristic.

Figure 2:
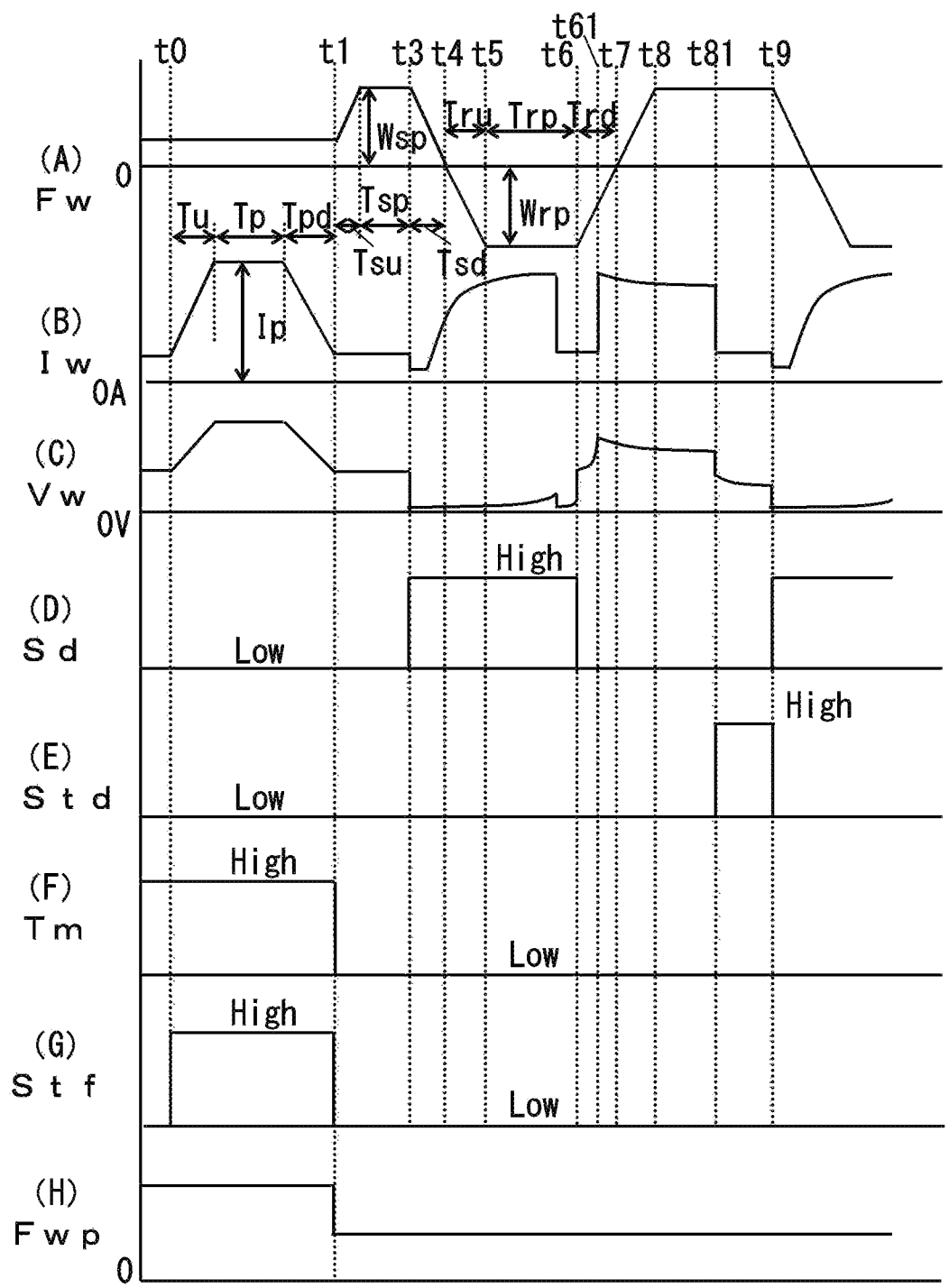
FIG. 2 is a timing chart of the respective signals of when switching a pulse arc welding period Ta to a short-circuiting transition arc welding period Tc on the welding power supply of FIG. 1.

FIG. 2 is a timing chart of the respective signals of when switching from the pulse arc welding period Ta to the short-circuiting transition arc welding period Tc of the power supply of FIG. 1 showing the arc welding method according to an embodiment of the present disclosure. FIG. 2(A) shows a temporal variation of the pull feeding speed Fw, FIG. 2(B) shows a temporal variation of the welding current Iw, FIG. 2(C) shows a temporal variation of the welding voltage Vw, FIG. 2(D) shows a temporal variation of the short-circuiting determination signal Sd, FIG. 2(E) shows a temporal variation of the small current period signal Std, FIG. 2(F) shows a temporal variation of the timer signal Tm, FIG. 2(G) shows a temporal variation of the final pulse cycle signal Stf, and FIG. 2(H) shows a temporal variation of the push feeding speed Fwp.

Time t0 is the time when the pulse cycle newly starts after the time elapsed since the timer signal Tm shown in FIG. 2(F) has changed to the High level (startup time of the pulse arc welding period Ta) reaches a time period determined by the pulse arc welding time setting signal Tar of FIG. 1. At time to, as shown in FIG. 2(G), the final pulse cycle signal Stf changes to the High level and enters in the final pulse cycle Tsf. During the final pulse cycle Tsf of time t0-t1, as shown in FIG. 2(B), in a predetermined final peak rising period Tu, a transition current is fed which rises up to the peak current value Ip determined by the peak current setting signal Ipr of FIG. 1. Thereafter, in a predetermined final peak period Tp, the current of the above peak current value Ip is fed. Thereafter, in a predetermined final peak falling period Tpd, a transition current is fed which falls from the above peak current value Ip to the base current value Ib determined by the base current setting signal Ibr of FIG. 1. At time t1, when the final peak falling period Tpd ends and the welding current Iw becomes equal to the above base current Ib, as shown in FIG. 2(G), the final pulse cycle signal Stf returns to the Low level, and the final pulse cycle Tsf ends. The values of the final peak rising period Tu, the final peak period Tp, and the final peak falling period Tpd during the final pulse period Tsf are set to values with which the droplet formed in the final pulse period Tsf do not transition.

Time t1 is a timing that a new pulse cycle starts and the process goes into the final pulse cycle Tsf, and the pulse current setting signal Iar of FIG. 1 becomes equal to the value of the base current setting signal Ibr of FIG. 1 during the final pulse cycle Tsf, after an elapse of a period determined by the pulse arc welding period setting signal Tar of FIG. 1 since the change of the timer signal Tm to the High level (the pulse arc welding period Ta) shown in FIG. 2(F). At time t1, as shown in FIG. 2(F), the timer signal Tm changes from the High level to the Low level. Therefore, at time t1, the process switches from the pulse arc welding period Ta to the short-circuiting transition arc welding period Tc. In a period before time t1, as shown in FIG. 2(A), the pull feeding speed Fw is a constant speed for the forward feeding determined by the pulse forward feeding speed setting signal Fasr of FIG. 1. On the other hand, as shown in FIG. 2(H), the push feeding speed Fwp is a constant speed for the forward feeding determined by the pulse push feeding speed setting signal Fapr of FIG. 1. One of processings 1)-3) is selected by the push feeding speed compensation circuit FPH of FIG. 1 to perform the compensation-control of the push feeding speed Fwp. In the case where processing 1) is selected, the push feeding speed Fwp is subjected to variable speed control so that the value of the storage amount signal Wb of the intermediate wire storage of FIG. 1 is equal to the target value. In the case where processing 2) is selected, the push feeding speed Fwp is subjected to the compensation-control only when the error between the value of the storage amount signal Wb of the intermediate wire storage of FIG. 1 and the target value is outside the predetermined range. In the case where processing 3) is selected, the push feeding speed Fwp is not subjected to the compensation-control, and therefore takes a constant value. As shown in FIG. 2(C), the welding voltage Vw has a wave form similar to that of the welding current Iw. As shown in FIG. 2(D), the short-circuiting determination signal Sd stays at the Low level since the arc period continues. As shown in FIG. 2(E), the small current period signal Std stays at the Low level.

At time t1, as shown in FIG. 2(F), the timer signal Tm changes to the Low level and enters in the short-circuiting transition arc welding period Tc. In response to this, as shown in FIG. 2(A), the pull feeding speed Fw is accelerated to the forward feeding peak value Wsp determined by the forward feeding peak value setting signal Wsr of FIG. 1, and maintains its value until short-circuiting occurs at time t3. The forward feeding peak value Wsp during this period may be set to a value different from that in the steady period of the short-circuiting transition arc welding period Tc. This different value is set so that the welding status during this period is stable.

As shown in FIG. 2(H), the push feeding speed Fwp is a constant speed for the forward feeding determined by the short-circuiting arc push feeding speed setting signal Fcpr of FIG. 1 during the short-circuiting transition arc welding period Tc after time t1. The push feeding speed Fwp is not subjected to the compensation-control.

During a period from the start of the short-circuiting transition arc welding period Tc at time t1 to the first occurrence thereafter of the short-circuiting at time t3, as shown in FIG. 2(B), as the welding power supply has a constant current characteristic, the welding current Iw takes a low level current value determined by the low level current setting signal Ilr of FIG. 1.

The pull feeding speed Fw shown in FIG. 2(A) is controlled to take the value of the short-circuiting arc pull feeding speed setting signal Fcr output from the short-circuiting arc pull feeding speed setting circuit FCR of FIG. 1. The pull feeding speed Fw is formed of the forward feeding acceleration period Tsu determined by the forward feeding acceleration period setting signal Tsur of FIG. 1, the forward feeding peak period Tsp that continues until an occurrence of short-circuiting, the forward feeding deceleration period Tsd determined by the forward feeding deceleration period setting signal Tsdr of FIG. 1, the backward feeding acceleration period Tru determined by the backward feeding acceleration period setting signal Trur of FIG. 1, the backward feeding deceleration peak period Trp that continues until an occurrence of the arc, and the backward feeding deceleration period Trd determined by the backward feeding deceleration period setting signal Trdr of FIG. 1. Further, the forward feeding peak value Wsp is determined by the forward feeding peak value setting signal Wsr of FIG. 1, and the backward feeding peak value Wrp is determined by the backward feeding peak value setting signal Wrr of FIG. 1. As a result, the short-circuiting arc feeding speed setting signal Fcr has a feeding pattern which varies to an approximate trapezoidal wave which projects towards positive and negative sides.

One of processings 1)-5) is selected by the pull feeding speed compensation circuit FH of FIG. 1, and in FIG. 2, the forward feeding peak value Wsp (the forward feeding peak value setting signal Wsr) and/or the backward feeding peak value Wrp (the backward feeding peak value setting signal Wrr) are subjected to the compensation-control.

Exemplary numerical values of the compensation-controls of the above pull feeding speed Fw are shown below. Suppose that Wss=60 m/min and Wrs=−50 m/min. In the case where Ew=2:

In the case of processing 1), Wsr=60+2=62, Wrr=−50
In the case of processing 2), Wsr=60, Wrr=−50+2=−48
In the case of processing 3), Wsr=60+2=62, Wrr=−50+2=−48
In the case of processing 4), since Ew≥0, Wsr=60+2=62, Wrr=−50
In the case of processing 5), since Ew≥0, Wsr=60, Wrr=−50+2=−48

Further, in the case where Ew=−3:
In the case of processing 1), Wsr=60−3=57, Wrr=−50
In the case of processing 2), Wsr=60, Wrr=−50−3=−53
In the case of processing 3), Wsr=60−3=57, Wrr=−50−3=−53
In the case of processing 4), since Ew<0, Wsr=60, Wrr=−50−3=−53

In the case of processing 5), since Ew<0, Wsr=60−3=57, Wrr=−50

<Operation During the Short-Circuiting Period of Time t3-t6>

At the occurrence of short-circuiting at time t3 in the forward feeding peak period Tsp, as shown in FIG. 2(C), the welding voltage Vw rapidly decreases to the short-circuiting voltage value of several volts, and therefore as shown in FIG. 2(D), the short-circuiting determination signal Sd changes to the High level (the short-circuiting period). In response to this, the process goes into the predetermined forward feeding deceleration period Tsd of time t3-t4, and as shown in FIG. 2(A), the pull feeding speed Fw decreases from the above forward feeding peak value Wsp to 0. For example, the forward feeding deceleration period Tsd is set as 1 ms.

As shown in FIG. 2(A), the pull feeding speed Fw enters into the predetermined backward feeding acceleration period Tru of time t4-t5, and is accelerated from 0 to the above backward feeding peak value Wrp. In this period, the short-circuiting period still continues. For example, the backward feeding acceleration period Tru is set as 1 ms.

When the backward feeding acceleration period Tru ends at time t5, as shown in FIG. 2(A), the pull feeding speed Fw enters into the backward feeding peak period Trp, and takes the above backward feeding peak value Wrp. The backward feeding peak period Trp continues until the occurrence of the arc at time t6. Therefore, the period of time t3-t6 becomes the short-circuiting period. The backward feeding peak period Trp is, for example, around 4 ms. The backward feeding peak value Wrp, which is or is not subjected to the modulation-control, is −60 m/min, for example.

As shown in FIG. 2(B), the welding current Iw during the short-circuiting period of time t3-t6 takes a predetermined initial current value during the predetermined initial period. Thereafter, the welding current Iw rises at a predetermined inclination of the short-circuiting time, and when it reaches a predetermined peak value of the short-circuiting time, it maintains that value.

As shown in FIG. 2(C), the welding voltage Vw starts rising, approximately at the time when the welding current Iw takes the peak value of the short-circuiting time. This is because a constriction is gradually formed at the molten tip of the welding wire 1, due to a pinch force of the backward feeding of the welding wire 1 and the welding current Iw.

Thereafter, when an increase of the welding voltage Vw reaches the reference value, it is determined that the formation status of the constriction has become the reference status, the constriction detection signal Nd of FIG. 1 changes to the High level.

In response to the change of the constriction detection signal Nd to the High level, the driving signal Dr of FIG. 1 changes to the Low level. Therefore, the transistor TR of FIG. 1 turns to the off state and the decreasing resistor R of FIG. 1 is inserted in the conducting passage of the welding current Iw. At the same time the short-circuiting arc current setting signal Icr of FIG. 1 decreases to the value of the low level current setting signal Ilr. Thus, as shown in FIG. 2(B), the welding current Iw rapidly decreases from the peak value of the short-circuiting time to the low level current value. When the welding current Iw decreases to the low level current value, the driving signal Dr returns to the High level, the transistor TR turns to the on state, and the decreasing resistor R is short-circuited. As shown in FIG. 2(B), the welding current Iw maintains its low level current value until the elapse of a predetermined delay period starting from a re-occurrence of the arc, since the short-circuiting arc current setting signal Icr stays at the low level current setting signal Ilr. Therefore, the transistor TR is in the off state only during the period from the time point when the constriction detection signal Nd changes to the High level to the time point when the welding current Iw decreases to the low level current value. As shown in FIG. 2(C), the welding voltage Vw temporarily decreases due to the decrease of the welding current Iw, but rapidly increases thereafter. The respective parameters described above are, for example, set to the following values: the initial current=40 A, the initial period=0.5 ms, the slope during the short-circuiting time=180 mA/ms, the peak value during the short-circuiting time=400 A, the low level current value=50 A, and the delay period=0.5 ms.

<Operation During the Arc Period of Time t6-t9>

At time t6, when the constriction is developed by the pinch force due to the backward feeding of the welding wire and the conduction of the welding current Iw and the arc occurs, as shown in FIG. 2(C), the welding voltage Vw rapidly increases up to the arc voltage of tens of volts. Therefore, as shown in FIG. 2(D), the short-circuiting determination signal Sd changes to the Low level (the arc period). In response to this, the process enters in the predetermined backward feeding deceleration period Trd of time t6-t7, and as shown in FIG. 2(A), the pull feeding speed Fw decreases from the above backward feeding peak value Wrp to 0.

When the backward feeding deceleration period Trd ends at time t7, the process enters in the predetermined forward feeding acceleration period Tsu of time t7-t8. In this forward feeding acceleration period Tsu, as shown in FIG. 2(A), the pull feeding speed Fw is accelerated from 0 to the above forward feeding peak value Wsp. During this period the arc period continues. For example, the forward feeding acceleration period Tsu is set to 1 ms.

When the forward feeding acceleration period Tsu ends at time t8, as shown in FIG. 2(A), the pull feeding speed Fw enters in the forward feeding peak period Tsp, and reaches the above forward feeding peak value Wsp. Also during this period, the arc period continues. The forward feeding peak period Tsp continues until the short-circuiting occurs at time t9. Therefore, the period during time t6-t9 becomes the arc period. Further, when the short-circuiting occurs, the process returns to the operation of time t3. Although the forward feeding peak period Tsp is not a predetermined value, it is around 4 ms. There is a case where the forward feeding peak period Wsp, which is or is not subjected to the modulation-control, is 70 m/min, for example.

When the arc occurs at time t6, as shown in FIG. 2(C), the welding voltage Vw rapidly increases to the arc voltage value of tens of volts. On the other hand, as shown in FIG. 2(B), the welding current Iw continuously takes the low level current value during the delay period of time t6-t61. Then, from time t61 the welding current Iw rapidly increases to the peak value, and takes a large current value which gradually decreases thereafter. In this large current arc period of time t61-t81, the voltage has a constant voltage characteristic, as feedback control of the welding power supply is performed by the voltage error amplification signal Ev of FIG. 1. Therefore, during the large current arc period the value of the welding current Iw varies depending on the arc load.

At time t81 where the current dropping time determined by the current dropping time setting signal Tdr of FIG. 1 elapses after the occurrence of the arc at time t6, as shown in FIG. 2(E), the small current period signal Std changes to the High level. In response thereto, the welding power supply switches from the constant voltage characteristic to the constant current characteristic. Therefore, as shown in FIG. 2(B), the welding current Iw decreases to the low level current value, and maintains its value until time t9 where the short-circuiting occurs. Similarly, as shown FIG. 2(C), the welding voltage Vw also decreases. The small current period signal Std returns to the Low level when the short-circuiting occurs at time t9.

The short-circuiting transition arc welding period Tc includes a plurality of cycles where the short-circuiting period and the arc period repeats. One cycle of short-circuiting/arc is around 10 ms, for example. The short-circuiting transition arc welding period Tc is around 50-500 ms, for example. In the case of FIG. 2, at the starting time of the base period of the status where the droplet does not transition, the process switches to the short-circuiting transition arc welding period Tc. Other than this, the switching may occur in the middle of the base period Tb.

Figure 3:
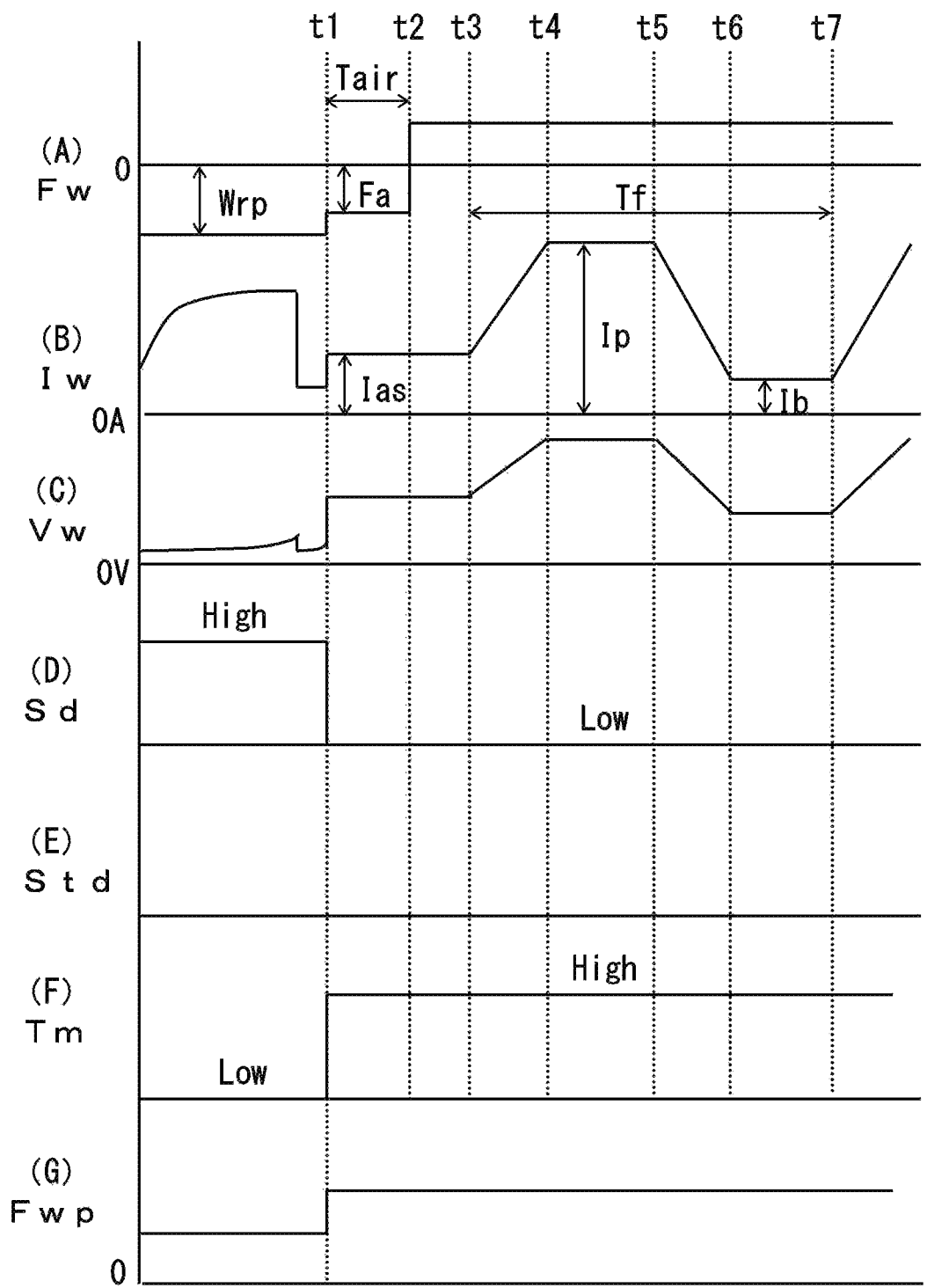
FIG. 3 is a timing chart of the respective signals of when switching the short-circuiting transition arc welding period Tc to the pulse arc welding period Ta on the welding power supply of FIG. 1.

FIG. 3 is a timing chart of the respective signals of when the switching from the short-circuiting transition arc welding period Tc to the pulse arc welding period Ta occurs at the welding power supply of FIG. 1 that shows the arc welding method according to an embodiment of the present disclosure. FIG. 3(A) shows the temporal variation of the pull feeding speed Fw, FIG. 3(B) shows the temporal variation of the welding current Iw, FIG. 3(C) shows the temporal variation of the welding voltage Vw, FIG. 3(D) shows the temporal variation of the short-circuiting determination signal Sd, FIG. 3(E) shows the temporal variation of the small current period signal Std, FIG. 3(F) shows the temporal variation of the timer signal Tm, and FIG. 3(G) shows the temporal variation of the push feeding speed Fwp.

At time t1, as shown in FIG. 3(B), the welding current Iw takes the low level current value, as the short-circuiting has just been released and the arc has just re-occurred. Further, time t1 is a time point when the short-circuiting determination signal Sd changes to the Low level (the arc period) for the first time after the period determined by the short-circuiting transition arc welding period setting signal Tcr of FIG. 1 has elapsed since the time point when the timer signal Tm shown in FIG. 3(F) changes to the Low level (the short-circuiting transition arc welding period Tc). Therefore, as shown in FIG. 3(F), the timer signal Tm changes from the Low level to the High level. Accordingly, the process switches from the short-circuiting transition arc welding period Tc to the pulse arc welding period Ta at time t1. In FIG. 3, in the period before time t1, as shown in FIG. 3(A), the pull feeding speed Fw takes the backward feeding peak value Wrp. As shown in FIG. 3(C), the welding voltage Vw takes the short-circuiting voltage value. As shown in FIG. 3(D), the short-circuiting determination signal Sd changes from the High level (the short-circuiting period) to the Low level (the arc period) at time t1. As shown in FIG. 3(E), the small current period signal Std remains at the Low level. As shown in FIG. 3(G), the push feeding speed Fwp is a constant speed determined by the short-circuiting arc push feeding speed setting signal Fcpr, and the forward feeding is carried out.

At time t1, as shown in FIG. 3(F), the timer signal Tm changes to the High level and the process enters in the pulse arc welding period Ta. In response to this, as shown in FIG. 3(A), the pull feeding speed Fw enters in the pulse initial backward feeding period Tair determined by the pulse initial backward feeding period setting signal Tarr of FIG. 1. The pull feeding speed Fw during this pulse initial backward feeding period Tair of time t1-t2 becomes the pulse initial backward feeding speed Fa determined by the pulse initial backward feeding speed setting signal Farr of FIG. 1. When the pulse initial backward feeding period Tair ends at time t2, as shown in FIG. 3(A), the pull feeding speed Fw becomes the pulse forward feeding speed Fas determined by the pulse forward feeding speed setting signal Fasr of FIG. 1, and the forward feeding is performed at a constant feeding speed. No compensation-control as to this pull feeding speed Fw. On the other hand, as shown in FIG. 3(G), the push feeding speed Fwp is, during the pulse arc welding period Ta after time t1, a speed determined by the pulse push feeding speed setting signal Fapr of FIG. 1, and the forward feeding is performed. One of processings 1)-3) is selected by the push feeding speed compensation circuit FPH of FIG. 1, and the compensation-control as to this push feeding speed Fwp is performed. In the case where processing 1) is selected, the push feeding speed Fwp is subjected to the variable speed control so that the value of the storage amount signal Wb of the intermediate wire storage of FIG. 1 is equal to the target value. In the case where processing 2) is selected, the push feeding speed Fwp is subjected to the variable speed control only when the error between the value of the storage amount signal Wb of the intermediate wire storage of FIG. 1 and the target value is outside the predetermined range. In the case where processing 3) is selected, the push feeding speed Fwp is not subjected to the variable speed control, and therefore takes a constant value. Here, during the pulse initial backward feeding period Tair of time t1-t2, the push feeding speed Fwp may take a value determined by the short-circuiting arc push feeding speed setting signal Fcpr of FIG. 1.

When the process enters in the pulse arc period Ta at time t1, as shown in FIG. 3(B), the welding current Iw enters in the pulse initial current period Tas determined by the pulse initial current period setting signal Tasr of FIG. 1. The welding current Iw during the pulse initial current period Tas of this time t1-t3 becomes the pulse initial current Ias determined by the pulse initial current setting signal Iasr of FIG. 1.

After time t3, the process enters in a steady period. As shown in FIG. 3(B), in a predetermined steady peak rising period Tu of time t3-t4, the transition current is conducted which rises up to the peak current value Ip predetermined by the peak current setting signal Ipr of FIG. 1. In a predetermined steady peak period Tp of time t4-t5, the transition current is fed with the above peak current value Ip. In a predetermined steady state peak falling period Tpd of time t5-t6, the transition current is fed which falls from the above peak current value Ip to the base current value Ib determined by the base current setting signal Ibr of FIG. 1. In the predetermined base period Tb of time t6-t7, the transition current is fed with the above base current value Ib. In the pulse ark welding period Ta, the welding power supply has a constant current characteristic. Therefore, the welding current Iw is set by the pulse current setting signal Iar of FIG. 1. As shown in FIG. 3(C), the welding voltage Vw has a wave form similar to the current waveform. A period of time t3-t7 corresponds to one pulse cycle Tf. To keep the arc length maintained to an appropriate value, the peak current Ip and the base current Ib are modulation-controlled (current modulation-controlled) so that the average value of the welding voltage Vw is equal to the target value. As other methods of the modulation-control, the frequency modulation-control to modulate the pulse cycle Tf, the peak period modulation-control to modulate the peak period Tp, and so forth can be mentioned. In any kind of the modulation-controls, the welding status can be made favorable by having what is called one pulse cycle one droplet transition status where one droplet is transitioned during one pulse cycle Tf.

Exemplary numerical values of the respective parameters are Tu=1.5 ns, Tp=0.2 ms, Tpd=1.5 ms, Tb=7 ms, Ip=350-450 A, and Ib=30-80 A.

The pulse arc welding period Ta includes a plurality of pulse cycles Tf. The pulse cycle Tf is around 10 ms, for example. The pulse arc welding period Ta is around 50-500 ms, for example.

At time t1 where the pulse arc welding period Ta starts, the short-circuiting has just been released and therefore the arc length is very short. The pulse initial backward feeding period Tair that starts at time t1 is set so that the arc length is as long as the desired value. By feeding the peak current Ip for the first time after time t3 which is after when the arc length is as long as the desired value, the droplet formation status can be made stable from the first cycle on. Thus, the switching from the short-circuiting transition arc welding period Tc to the pulse arc welding period Ta can be made smoothly. Therefore, the pulse initial backward feeding period Tair and the pulse initial backward feeding speed Fa are set to the values with which the arc length can be as long as the desired value. To attain this, the pulse initial backward feeding period Tair is set to a period which is at least longer than the backward feeding deceleration period Trd of FIG. 2. Further, the pulse initial backward feeding speed Fa is smaller than the backward feeding peak value Wrp of FIG. 2. For example, Tar=3 ms and Fa=−6 m/min.

Further, the pulse initial backward feeding period Tair can be a period where the welding voltage Vw rises up to the reference voltage value, as well. The welding voltage Vw is in a proportional relationship with the arc length. Therefore, by making the reference voltage value correspond to the desired arc length, the pulse initial backward feeding period Tair can be set automatically, which makes the setting process of the parameters easy.

Further, in the pulse initial backward feeding period Tair, the welding current Iw is made larger than the base current Ib, and is maintained, at the same time, to the pulse initial current Ias which is set smaller than the peak current Ip. The pulse initial current Ias is fed during the predetermined pulse initial current period Tas. It is configured that Tar is smaller than Tas. By making the pulse initial current Ias larger than the base current Ib, melting of the welding wire is facilitated and the re-short-circuiting between the welding wire and the base material can be prevented while the arc length is short. Therefore, the sputtering at the time of switching to the pulse arc welding period Ta can be reduced to make the switching further smoother. By making the pulse initial current Ias smaller than the peak current Ip, it can be prevented that the arc flares up rapidly and the arc length becomes excessively larger than the desired value. For example, Tas=5 ms and Ias=100 A.

Further, after the elapse of the pulse initial backward feeding period Tair, the first peak current Ip is fed. That is, it is configured that Tar is smaller than Tas. After the pulse initial backward feeding period Tair ends, by starting the first pulse cycle, the droplet transition status in the first pulse cycle can be certainly made stable.

The arc welding method realized by the above embodiments has, for example, the following process: (1) Feed the welding wire with the push-pull feeding control by the push side feeding motor that rotates for the forward feeding and the pull side feeding motor that rotates for the forward feeding and for the backward feeding. (2) Provide the intermediate wire storage that temporarily stores (a part of) the welding wire at the feeding passage between the push side feeding motor and the pull side feeding motor, and compensate the push feeding speed of the push side feeding motor or the pull feeding speed of the pull side feeding motor based on the wire storage amount of the intermediate wire storage to feed the welding wire. (3) Perform welding by alternately switching the period of performing the pulse arc welding by the rotation for the forward feeding of the push side feeding motor and the rotation for the forward feeding of the pull side feeding motor to forward feed the welding wire and feed the peak current and the base current, and the period of performing the short-circuiting transition arc welding by the rotation for the forward feeding of the push side feeding motor and the rotation for the forward/backward feeding of the pull side feeding motor to forward/backward feed the welding wire and feed the short-circuiting current and the arc current.

In the period of performing the short-circuiting transition arc welding (the short-circuiting transition arc welding period), a wave form parameter of the pull feeding speed is compensated based on the wire storage amount. The wave form parameter is, for example, the forward feeding peak value and/or backward feeding peak value. Further, the wave form parameter is the forward feeding peak value when the wire storage amount is larger than the target value, and is the backward feeding peak value when the wire storage amount is smaller than the target value. Otherwise, the wave form parameter is the backward feeding peak value when the wire storage amount is larger than the target value, and is the forward feeding peak value when the wire storage amount is smaller than the target value.

Conventionally, in the arc welding method to perform welding by alternately switching the pulse arc welding period to forward feed the welding wire and the short-circuiting transition arc welding period to forward/backward feed the welding wire, during the short-circuiting transition arc welding period, in synchronization with the occurrence timing of the short-circuiting period and the arc period, the forward feeding period and the backward feeding period are switched to each other. At this time, the short-circuiting transition arc welding period is repeated at a relatively short cycle, the welding status is in a transient status. As a result, the time ratio of the short-circuiting period and the arc period varies, and the time ratio of the forward feeding period and the backward feeding period varies. Accordingly, the average feeding speed of the welding wire (the average value of the pull feeding speed) varies. When the average feeding speed varies, the deposition amount varies, and therefore the welding quality deteriorates.

On the other hand, according to the present embodiment, when the time ratio of the forward feeding period and the backward feeding period varies and the average value of the pull feeding speed varies, there occurs a differential between the pull feeding speed and the push feeding speed that is constant. As a result, there occurs an error between the wire storage amount and the target amount of the intermediate wire storage. By compensating the forward feeding peak value and/or the backward feeding peak value to cancel out this error, the push feeding speed and the average value of the pull feeding speed can be made equal to each other. Therefore, the average value of the pull feeding speed can be returned to the predetermined value. Further, even when the welding status is in the transient status, in the present embodiment, wave parameters of the pull feeding speed is directly compensated, and therefore the feeding of the welding wire can be performed stably with high precision.

More preferably, according to the present embodiment, in the period to perform the pulse arc welding, the compensation of the push feeding speed and the pull feeding speed based on the wire storage amount is not performed. Depending on the welding conditions such as the material of the welding wire and the average welding current value, the welding status can be unstable if the compensation-control is performed during the pulse arc welding period. In such a case, the welding status can be stabilized by not performing the compensation-control during the pulse arc welding period.

More preferably, according to the present embodiment, in the period to perform the pulse arc welding, the compensation of the push feeding speed is performed based on the wire storage amount. Depending on the welding conditions such as the material of the welding wire and the average welding current value, the welding status can be stabilized by performing the compensation-control during the pulse arc welding period. Preferably, the subject of the compensation-control is the push feeding speed rather than the pull feeding speed, as the feeding speed of the welding wire close to the location of the arc occurrence can be made constant. Further, when the wire storage amount is out of the predetermined range, the push feeding speed is compensated based on the wire storage amount. According to the configuration like this, the welding status can be more stabilized.

The invention claimed is:

1. An arc welding method comprising:
feeding a welding wire by push-pull feeding control with a push side feeding motor that rotates for forward feeding and a pull side feeding motor that rotates for the forward feeding and backward feeding;
temporarily storing the welding wire in an intermediate wire storage arranged at a feeding passage between the push side feeding motor and the pull side feeding motor;
feeding the welding wire by compensating a push feeding speed of the push side feeding motor or a pull feeding speed of the pull side feeding motor based on a wire storage amount of the intermediate wire storage;
alternately switching, to each other, a pulse arc welding period and a short-circuiting transition arc welding period, the pulse arc welding period being configured such that pulse arc welding is performed by forward feeding the welding wire by a rotation for the forward feeding of the push side feeding motor and a rotation for the forward feeding of the pull side feeding motor and feeding a peak current and a base current, the short-circuiting transition arc welding period being configured such that short-circuiting transition arc welding is performed by forward/backward feeding the welding wire by the rotation for the forward feeding of the push side feeding motor and a rotation for the forward/backward feeding of the pull side feeding motor and feeding a short-circuiting current and an arc current,
wherein during the short-circuiting transition arc welding period, a wave form parameter of the pull feeding speed is compensated based on the wire storage amount, and
the wave form parameter is one of:
a forward feeding peak value when the wire storage amount is larger than a target value and is a backward feeding peak value when the wire storage amount is smaller than the target value; or
a backward feeding peak value when the wire storage amount is larger than a target value and is a forward feeding peak value when the wire storage amount is smaller than the target value.

2. The method according to claim 1, wherein during the pulse arc welding period, the push feeding speed and the pull feeding speed based on the wire storage amount are not compensated.

3. The method according to claim 1, wherein during the pulse arc welding period, the push feeding speed is compensated based on the wire storage amount.

4. The method according to claim 1, wherein during the pulse arc welding period, when the wire storage amount is out of a predetermined range, the push feeding speed is compensated based on the wire storage amount.

* * * * *